Jan. 14, 1969     M. MacFARLAND DONALDSON ET AL    3,421,927
SHEET POLYETHYLENE CARRYING A FUSED HYDROPHILIC TIECOAT OF
A POLYETHYLENE-EMULSIFYING AGENT MIXTURE AND
A HYDROPHOBIC ORGANIC TOPCOAT
Filed Sept. 15, 1964

INVENTORS
MALCOLM M. DONALDSON
ADOLPH ROY MORRIS
BY

ATTORNEY

United States Patent Office 3,421,927
Patented Jan. 14, 1969

3,421,927
SHEET POLYETHYLENE CARRYING A FUSED HYDROPHILIC TIECOAT OF A POLYETHYLENE-EMULSIFYING AGENT MIXTURE AND A HYDROPHOBIC ORGANIC TOPCOAT
Malcolm Macfarland Donaldson, Bedford Village, N.Y., and Adolph Roy Morris, South Norwalk, Conn., assignors to American Cyanamid Company, Stamford, Conn., a corporation of Maine
Filed Sept. 15, 1964, Ser. No. 396,485
U.S. Cl. 117—76                                                5 Claims
Int. Cl. B32b 27/32

ABSTRACT OF THE DISCLOSURE

Sheet polyethylene possesses good affinity for hydrophilic organic topcoat material when it has fused thereto a tiecoat consisting essentially of a mixture of polyethylene and an organic emulsifying agent, the amount of emulsifying agent being sufficiently large that the tiecoat is hydrophilic.

---

The present invention relates to sheet polyethylene which carries a tiecoat of novel composition having good affinity for hydrophobic organic topcoat material. The invention includes tiecoated polyethylene with and without topcoat material, and the processes involved.

In this specification, the term "polyethylene," when used without qualification, designates polymerized ethylene composed substantially of the elements carbon and hydrogen, so that it is substantially free from oxidation products and nitrogenous additives, and possesses poor affinity for hydrophobic topcoat material. The term "tiecoat" designates a coating on sheet polyethylene which imparts to the polyethylene sheet good affinity for topcoat material; the coating may be continuous or discontinuous.

Polyethylene is a paraffin hydrocarbon which has a waxy, hydrophobic surface which adheres poorly or not at all to commonly-used hydrophobic organic topcoat materials, for example, nitrocellulose lacquer, vinylidene chloride copolymers termed "Saran," pressure-sensitive adhesives including chlorinated rubber, alkyd resin paints, starch adhesives (including mucilage), and printing ink. Its adhesion for organic materials has been so poor that in fact it has been proposed as a parting agent.

Methods for overcoming this lack of affinity for topcoat material are proposed in Wolinski U.S. Patent No. 3,061,882 (1962) and Fitz Harris U.S. Patent No. 3,093,- 264 (1963). In general they involve the use of complicated apparatus, hazardous chemicals, or techniques difficult to apply such as oxidation of the surface of the polyethylene.

The discovery has now been made that sheet polyethylene, as defined above, possesses good affinity for hydrophobic organic topcoat materials when it carries a tiecoat consisting essentially of a mixture of polyethylene and an organic emulsifying agent, the amount of organic emulsifying agent present in the tiecoat being sufficiently large that the tiecoat is hydrophilic. The tiecoated sheet polyethylene is conveniently prepared by applying to sheet polyethylene an aqueous dispersion of colloidal polyethylene particles which contain or which have sufficient of a surface-active agent adsorbed thereon to render them hydrophilic, and drying the thus-coated film at a temperature sufficient to fuse the colloidal polyethylene particles to the sheet polyethylene. The colloidal polyethylene particles employed in the process have a flow point lower than the flow point of the sheet polyethylene to which it is applied and hence fuse to the polyethylene substrate at a temperature below the flow point of the latter. The surface of the resulting sheet is hydrophilic and is wettable by water.

Figure 1:
Figure 2:

The invention is illustrated by the drawing, wherein
FIGURE 1 is a vertical section showing schematically sheet polyethylene carrying on one side a discontinuous tiecoat of fused particles of a hydrophilic mixture of polyethylene and an organic emulsifying agent, and
FIGURE 2 shows in similar manner a similar tiecoated sheet wherein the tiecoat particles have been fused to form a continuous film.

A continuous or discontinuous topcoat may overlie the tiecoat shown in both figures.

The emulsifying agent present in the tiecoat may be non-ionic or may be ionic (cationic or anionic). The tiecoat need not be a continuous film but may be composed of discrete colloidal particles fused to the surface of the sheet polyethylene.

The sheet polyethylene produced by the process of the present invention in preferred embodiments possesses a very satisfactory affinity for the principal topcoat materials used at the present time to improve the heat-sealing properties of polyethylene and its vapor transmission characteristics.

The dispersions of colloidal polyethylene which are employed in the present invention may be prepared by introducing ethylene under high pressure into hot water containing an emulsifying agent and a polymerization catalyst. Other methods may be used including those disclosed in the book "Polyolefin Resin Processes" by Sittig (copyright 1961 by the Gulf Publishing Co., Houston, Tex.). The amount of emulsifying agent present should be sufficiently large that the polyethylene recovered from the process is hydrophilic, i.e., so that it is water-wettable. Since the catalysts used are generally anionic, the emulsifying agents used are generally non-ionic or anionic, but when the catalyst is cationic the emulsifying agent may be cationic. The product of this process is a fluid aqueous colloidal dispersion (which may contain as much as 40% solids) of colloidal polyethylene particles; the particles have a surface content of the emulsifying agent. The term "colloidal" as used herein means that the particles are of such size that the dispersion shows no more than moderate tendency to cream on standing.

Among the emulsifying agents used to form dispersions of hydrophilic polyethylene useful for the practice of the present invention are polyethylene oxide, nonylphenolethylene oxide condensate, the formaldehyde condensation product of naphthalene sulfonic acid, the half ester of lauryl alcohol with sulfuric acid, di-2- ethylhexyl sodium sulfosuccinate, and the emulsifying agents formed by polymerization of ethylene in the presence of alkali metal persulfate which are composed of methylene chains attached to $-OSO_3X$ substituents, wherein X is sodium or potassium.

It is possible to prepare a fluid colloidal dispersion of polyethylene by slowly cooling a solution of polyethylene in an organic solvent. Colloidal polyethylene forms as the solution cools. The resulting dispersion, however, is unsuited for the process of the present invention because the colloidal particles have no content of dispersing agent and consequently are not hydrophilic.

In accordance with the present invention, the dispersion of colloidal hydrophilic polyethylene may be applied to the sheet polyethylene at any convenient solids content and in any convenient amount. Very minor amounts cause a pronounced benefit, so that evidently there is no amout however small which will not promote adhesion to at least some extent.

As a practical matter, we have found that best adhesion between the sheet polyethylene and the topcoat is generally achieved when the colloidal hydrophilic polyethylene is present on the film in amout equal to between 1 and 6 oz. per 1,000 ft.$^2$, so that this amount is preferred. This amount is not necessarily sufficient to form a continuous film of polyethylene overlying the sheet polyethylene. The invention includes larger and smaller amounts than the amounts shown above which are believed optimum.

It will generally be found advantageous to dilute the colloidal hydrophilic polyethylene to a solids content of about 1%–10% solids, prior to application, and if desired a wetting agent may be added to promote even flow of the dispersion over the surface of the sheet polyethylene. The wetting agent should be compatible with the dispersion and where the dispersion is non-ionic or anionic, di-2-ethylhexyl sodium sulfosuccinate or the formaldehyde condensation product of naphthalene sulfonic acid (Tanak A) will generally be found suitable.

The flow point of the colloidal hydrophilic polyethylene should be less than the flow point of the sheet polyethylene, so as to ensure fusion of the colloidal polyethylene to the sheet polyethylene without deformation of the latter. In general, it appears advantageous for the two flow points to be about 10° C. apart.

The wet tiecoated sheet polyethylene is heated for a sufficient length of time and at a sufficient temperature to dry the coating and to cause the colloidal hydrophilic polyethylene to fuse to the sheet polyethylene substrate. The optimum temperature and duration of heating depend primarily on the amount of liquid to be evaporated, the flow point of the hydrophilic polyethylene, and the thickness of the sheet polyethylene substrate, and are most easily determined by laboratory trial using the times and temperatures shown in the examples below as guides in conjunction with the adhesive tape test shown below. Prolongation of the time the sheet material is held at fusion temperature causes the colloidal particles to fuse into a continuous film.

If desired, the resulting sheet material may be heat-sealed or topcoated in the same manner and with the same materials with which surface-oxidized sheet polyethylene has been heat-sealed and topcoated in the past either at once or after the tiecoated film has been rolled and shipped to a consumer.

The present invention is more particularly illustrated by the examples which follow. These examples are embodiments of the invention and are not to be construed as limitations thereon. Parts are by weight unless otherwise stated.

EXAMPLE 1

The following illustrates a process according to the present invention of preparing tiecoated sheet polyethylene carrying a discontinuous tiecoat composed of a hydrophilic mixture consisting essentially of polyethylene and a non-ionic emulsifying agent and the affinity of the tiecoated polyethylene for topcoat material.

The sheet polyethylene is polyethylene film having a melting point of 105° C. by ring and ball method. It is hydrophobic and is essentially a linear hydrocarbon polymer.

The tiecoating composition is a 40% by weight non-ionic colloidal dispersion of polyethylene (prepared by polymerizing ethylene at high pressure in hot water containing a redox catalyst and a non-ionic ethylene oxide-octylphenol condensate as emulsifying agent). The average particle size of the polyethylene thus prepared is less than 0.1 μ and the melting point of this polyethylene is 95° C. by ring and ball method.

A sample of this 40% dispersion is diluted to 1% solids with deionized water and is coated upon polyethylene film with a No. 3 Meyers rod. The film is oven-dried at 100° C. for one minute and carries a discontinuous hydrophilic coating of tiecoat thickness. Examination of the film under a microscope shows that the tiecoat is composed of discrete particles of polyethylene.

The film is topcoated with an emulsion formed by mixing (A) 10 parts of a 10% by weight aqueous vinylidene chloride:acrylonitrile emulsion (90:10 molar ratio) with (B) an aqueous solution containing (a) 10 parts of tetrahydrophthalic anhydride-adipic acid-neopentyl glycol-trimethylol ethane-polyethylene oxide ester resin having a molecular weight of about 4,000 and containing about 10 etherifiable hydroxyl groups per macromolecule, (b) di-2-ethylhexyl sulfosuccinate as dispersing agent, (c) 1 part of hexakis(methoxymethyl) melamine, and (d) p-toluenesulfonic acid as catalyst. The emulsion is applied by means of a No. 12 Meyers rod and the film is oven-dried for 3 minutes at 100° C.

The topcoat is not removed by the adhesive tape test, wherein 3″ of a 6″ length of cellulose tape coated with a pressure-sensitive adhesive ("Scotch" tape) is pressed upon the film to be tested and the "Scotch" tape is stripped from the film with a swift ripping motion. The topcoat is entirely stripped from the untreated polyethylene film by this test (i.e., from film which has not been treated with the colloidal hydrophilic polyethylene), showing that the parent film has practically no affinity for commonly-used topcoat material.

EXAMPLE 2

The following illustrates the effectivenes of polyethylene having a surface content of an anionic emulsifying agent as tiecoating agent for sheet polyethylene.

The procedure of Example 1 is repeated except that the tiecoating polyethylene dispersion is prepared by polymerizing ethylene under pressure in aqueous medium containing a higher alkyl sulfonate emulsifying agent and a redox catalyst.

The resulting film has substantially the same affinity for topcoat material as the film of Example 1.

EXAMPLE 3

The procedure of Example 1 is repeated except that the tiecoating polyethylene dispersion is applied by use of a No. 12 Meyers rod, resulting in a much thicker coating and the coated film is dried at 100° C. for 10 minutes so as to produce a tiecoat which is a fused continuous film.

The resulting film has substantially the same affinity for topcoat material as the film of Example 1, wherein the tiecoat is discontinuous.

EXAMPLE 4

Samples of the tiecoated film of Example 1 and samples of the same film without the tiecoat are topcoated with the topcoat solutions described below and the resulting wet films are oven-dried for 3 minutes at 100° C. The topcoat materials are applied as 10%–20% by weight solutions in appropriate solvents by means of a No. 12 Meyers rod. The adhesion of the topcoats to the pairs of film is determined by the adhesive tape test of Example 1.

(1) Toluene solution of 10 parts by weight of (a) a tetrahydrophthalic anhydride-adipic acid-neopentyl glycol-trimethylol ethane ester resin having a molecular weight of about 3,000 and containing about 10 etherifiable hydroxy substituents per macromolecule, (b) 1 part by weight of hexakis(methoxymethyl)melamine, and (c) p-toluenesulfonic acid as catalyst.

(2) Aqueous solution (B) of Example 1.

(3) Toluene solution of (a) 4 parts by weight of a tetrahydrophthalic anhydride-dimerized linoleic acid-1,5-pentanediol-trimethylol ethane ester resin having a molecular weight of about 4,000 and containing about 10 etherifiable hydroxyl groups per macromolecule, (b) 1 part by weight of hexakis(methoxymethyl)melamine, and (c) 4% based on the weight of resin solids of p-toluenesulfonic acid as catalyst.

(4) Floor varnish (an organic solution of an alkyd resin-phenolic resin blend containing a drier).

The topcoats were not detached from the tiecoated film by the adhesive tape, but were removed by the adhesive tape from the film which carried no tiecoat.

EXAMPLE 5

A United States postage stamp is pasted upon a sample of tiecoated polyethylene according to Example 1, and rubber stamp ink is impressed upon a portion of the same film. The procedure is repeated with a sample of polyethylene film which has not been tiecoated. The films are dried at 100° C. When the films are flexed, the postage stamp remains on the tiecoated film but pops from the film which is not tiecoated. The ink on the tiecoated film resists smudging when rubbed better than the ink on the film which carries no tiecoat.

We claim:

1. Sheet polyethylene carrying on at least one side a tiecoat fused thereto of a hydrophylic mixture consisting essentially of polyethylene and an organic emulsifying agent and over said tiecoat a hydrophobic organic topcoat.

2. Sheet polyethylene according to claim 1 wherein the emulsifying agent is non-ionic.

3. Sheet polyethylene according to claim 1 wherein the emulsifying agent is anionic.

4. Sheet polyethylene according to claim 1 wherein the tiecoat is a continuous coating.

5. Sheet polyethylene according to claim 1 wherein the tiecoat weighs 1 to 6 ounces per 1,000 ft.$^2$.

References Cited

UNITED STATES PATENTS

| | | | |
|---|---|---|---|
| 2,527,260 | 10/1950 | Hart et al. | 117—34 X |
| 2,628,172 | 2/1953 | Jenett | 117—161 X |
| 2,678,285 | 5/1954 | Browning | 117—138.8 |
| 2,699,392 | 1/1955 | Herrick et al. | 117—34 X |
| 2,963,452 | 12/1960 | Sinn et al. | 117—138.8 |
| 3,205,093 | 9/1965 | Lynch | 117—76 X |
| 3,222,211 | 12/1965 | Updegrove et al. | 117—76 |
| 3,296,162 | 1/1967 | Mantell et al. | 260—29.6 X |

WILLIAM D. MARTIN, *Primary Examiner.*

R. HUSACK, *Assistant Examiner.*

U.S. Cl. X.R.

117—138.8, 161; 260—29.6